United States Patent Office 3,556,827
Patented Jan. 19, 1971

3,556,827
AGGREGATE BINDER AND PAVING COMPOSITION
Kenneth E. McConnaughay, P.O. Box 1457, Lafayette, Ind. 47902
No Drawing. Continuation of application Ser. No. 673,312, Oct. 6, 1967, which is a continuation-in-part of application Ser. No. 655,241, July 21, 1967, which in turn is a continuation of application Ser. No. 392,630, Aug. 27,1964. This application Dec. 29, 1969, Ser. No. 888,119
Int. Cl. C08h 13/00, 17/22; C08j 1/41
U.S. Cl. 106—279
14 Claims

ABSTRACT OF THE DISCLOSURE

A binder for use with an aggregate for forming a paving composition in which said binder comprises a mixture including from about 5% to about 30% of a low molecular weight sub-mixture consisting essentially of fatty and rosin acids and saponifiable esters and having a molecular weight in the range of from about 80 to about 720, from about 5% to about 40% of a sub-mixture of unsaponifiable material, and from about 30% to about 90% of a higher molecular weight sub-mixture consisting essentially of fatty and rosin acids, decarboxylated rosins, and polymerized unsaponifiable matter and having a molecular weight in the range of from about 460 to about 1200. Said mixture is reacted with a reacting and dispersing agent and is then mixed with an aggregate, or with an aggregate and another binder such as an asphaltic material or portland cement to form a paving composition with high compressive strength.

---

This application is a streamline continuation of my copending application Ser. No. 673,212, filed Oct. 6, 1967, which is a continuation-in-part application of my copending continuation application Ser. No. 655,241, filed July 21, 1967 which is a continuation of my application Ser. No. 392,630, filed Aug. 27, 1964, and now all abandoned.

There are two basic types of pavement currently in use, rigid pavement and flexible pavement. Rigid pavement, which is normally formed from portland cement and an aggregate, is placed over a sub-grade and provides a rigid surface thereover. Such pavement has the advantage that it can be built with a relatively small depth, but it has the disadvantage that it lacks flexibiliy and therefore cracks due to expansion and contraction upon temperature changes. Further, such rigid pavement will not conform to the sub-grade and prevent hollow spots which leads to its breaking under heavy traffic loads. Once such a pavement cracks or breaks, it cannot heal itself at its point of failure.

Flexible type pavements are normally formed from a compacted aggregate or an aggregate and a bituminous material such as asphalt, an asphaltic emulsion, tar, road oils, cut-back asphalt, or the like. Such flexible pavements, because of their lack of rigidity, adapt themselves to the sub-grade and thus prevent hollow spots below the pavement surface. Further, such flexible pavements can be re-compacted and heal themselves at points of cracking or breaking to a much greater extent than can rigid pavements. However, because they are not as rigid as rigid pavements, flexible pavements normally have to be built to a greater depth than rigid pavements.

The instant invention provides an aggregate binder which can be employed in combination with binding materials for flexible pavements to make the resultant pavement more rigid, and which can be employed in combination with binders for rigid pavement to make the resultant pavement more flexible, and which can be employed as the sole binder for an aggregate, all to produce a pavement of the desired rigidity or flexibility. It is therefore an object of the invention to provide an aggregate binder which can be used alone or in combination with other binding materials to provide pavement of the desired rigidity and/or flexibility and stability, which can be used alone or in combination with other binding materials for producing a pavement with improved compressive strength and stability, which can be used alone or in combination with other binding materials for producing a pavement with improved strength and stability upon recompaction, and which can be used alone or in combination with other binding materials for producing a pavement having improved compaction characteristics.

The instant invention comprises an aggregate binder formed by the treatment of tall oil pitch, the residue by-product of the refining of crude tall oil. Crude tall oil, a starting product for forming the pitch, is a by-product of the kraft and sulfate process of making paper from wood pulp. The binder also can be prepared synthetically. A typical analysis of the binder stock is shown in the following table.

TABLE 1

| | |
|---|---|
| Specific gravity @ 77° F. | 1.0 |
| Flash (COC), ° F. | 455 |
| Viscosity, SSU @ 210° F. | 240 |
| Acid No. | 58 |
| Saponification No. | 115 |
| Rosin acid No. | 37 |
| Unsaponifiables, percent | 27.0 |
| Rosin acids, percent | 20 |
| Fatty acids, percent | 10 |
| Ash, percent | 0.5 |
| Moisture, percent | 0.1 |
| Copper, p.p.m. | 1 |
| Manganese, p.p.m. | 1 |
| Iron, percent | 0.16 |
| Fire point, ° F. | 495 |
| Softening point, ° F. | 77 |
| Pour point, ° F. | 86 |
| Penetration @ 77° F. | |
| 150 gr. cone | 200 |
| DISTILLATION @ 4 mm. Hg.: | |
| Initial B.P., ° F. | 520 |
| Temperature at which 70% of total components have boiled over, ° F. | 630 |

The binder stock is comprised of a mixture of three basic sub-mixtures or fractions. It has the general composition of from about 5% to about 30% of a low molecular weight fatty and rosin acid fraction, from about 5% to about 40% of an unsaponifiable material fraction, and from about 30% to about 90% of a high molecular weight fatty and rosin acid fraction.

The low molecular weight fatty and rosin acid fraction has a molecular weight in the range of from about 80 to about 720, with an average molecular weight of from about 300 to about 360. It consists essentially of rosin acids, saponifiable esters, and free fatty acids.

The unsaponifiable material fraction consists essentially of aliphatic alcohols, sterols, pigments, hydrocarbons, and appreciable amounts of cholesterol.

The high molecular weight fatty and rosin acid fraction has a molecular weight in the range from about 460 to about 1200, with an average molecular weight of about 900. It consists essentially of fatty acids, trimers and tetramers of polymerized rosin acids, decarboxylated rosins, and polymerized unsaponifiable matter.

Typical analysis of the high and low molecular weight fatty and rosin acid fractions are shown in the following table.

TABLE 2

High molecular weight fraction:
    Acid No.—90–170
    Ester value—9–16
    Free fatty acids—70%–90%
    Saponification No.—165–180
    Unsaponifiable matter—1%–3%
Low molecular weight fraction:
    Acid No.—32–72
    Free fatty acids—16%–36%
    Polymerized unsaponifiable matter—20%–30%
    Iodine No.—110–130

Because of the characteristics of the binder stock and the fractions thereof, an analysis of the individual fractions and the complete binder stock, more detailed than that set forth above and in Tables 1 and 2, is not available.

The three fractions can be separated from the tall oil pitch either chemically or by vacuum distillation. Such a vacuum distillation of tall oil pitch will yield about 48% of the high molecular weight fraction, about 28% of the low molecular weight fraction, and about 24% of the unsaponifiable fraction. Table 3 shows a typical distillation of tall oil pitch in which 7 cuts were made.

TABLE 3

| Cut No.: | Weight by percent | Average mol. wt. | Pot temp., °F. | Vapor temp., °F. | Press mm. |
|---|---|---|---|---|---|
| 1 | 9.6 | 366 | 445 | 370 | .200 |
| 2 | 9.8 | 450 | 512 | 390 | .305 |
| 3 | 9.8 | 463 | 574 | 448 | .600 |
| 4 | 9.7 | 471 | 590 | 480 | .550 |
| 5 | 9.5 | 455 | 604 | 496 | .600 |
| 6 | 8.8 | 431 | 628 | 520 | .600 |
| 7 | 8.4 | 472 | 680 | 583 | .800 |
| Bottoms | 34.4 | 1,918 | | | |

Cuts 1–3 from the distillation shown in Table 3 were combined to form the low molecular weight fraction, cuts 5–7 and 10% of the bottoms were combined to form the high molecular weight fraction, and the remainder of the bottoms formed the unsaponifiable fraction.

Each of the three fractions is also commercially available, and said fractions may be combined to produce a synthetic binder stock which can be used in forming a binder which can be employed as a cementing and stabilizing material for aggregates and soils. These three fractions are produced by Emery Industries, Inc., and others, and each fraction contains the same basic components that are present in the tall oil pitch obtained by the distillation of crude tall oil. The low molecular weight fatty and rosin acid fraction produced by Emery Industries, Inc. is identified as Emery Acid No. 1008–42 and is obtained from the distillation of tall oil pitch. A soya fatty acid residue, such as Emery 3001, which is the residue formed after distillation of soya fatty acid, can also be employed as the synthetic low molecular weight fatty and rosin acid fraction. The unsaponifiable material fraction is produced by Emery Industries, Inc. as Emery 1008–41A. Various paraffin, tar, asphalt, and other hydrocarbon residues of petroleum distillation and fractionation can also be substituted for the unsaponifiable material fraction. The high molecular fatty and rosin acid fraction is produced by Emery Industries as Emery 1008–97A. These three fractions can be combined using 5% to 30% of the low molecular weight fatty and rosin acid fraction, 5% to 40% of the unsaponifiable material fraction, and 30% to 90% of the high molecular weight fatty and rosin acid fraction to produce a complete synthetic binder stock having essentially the same properties and characteristics as the natural tall oil pitch binder stock obtained from the refining of crude tall oil.

In order for the binder stock, either natural (obtained from the refining of crude tall oil) or synthetic, to be effective as an aggregate binder and stabilizer, it must be combined with a reacting and dispersing agent. Several such agents can be employed. Examples of such agents are the hydroxides and halides of the alkali metals, the hydroxides and halides of the alkaline earth metals, aluminum hydroxide, chloride, and sulfate, iron chloride and sulfate, copper and zinc sulfate, ammonium chloride, hydroxide and sulfate, imidazolines, monoethanolamine, diethanolamine, triethanolamine, and the like. The amount of such agent added to the binder stock is dependent upon the characteristics of the paving composition which are desired and the particular agent employed. In using the hydroxides of the alkali metals, I have found that the addition of from 1% to 13.5% of said hydroxides, based upon the weight of the binder stock, produces excellent results. In using monoethanolamine, diethanolamine, and triethanolamine, I have found that the addition of from 1.4% to 12.6% of said amines, based upon the weight of the binder stock, produces excellent results. And in using the other agents listed above, I have found that the addition of from 3% to 15% of said agents, based upon the weight of the binder stock, produces excellent results. While all of such agents can be combined with the binder stock to produce the desired results, the use of NaOH is preferred since it is readily available at economic prices and is more efficient requiring smaller amounts to produce equivalent results.

If a sticky binder is desired, the smaller amounts of the reacting and dispersing agents will be employed. As the amounts of some of these agents reach the upper ends of their respective ranges, the resulting paving composition will have less water resistance. However, materials such as hydrated lime, sodium dichromate, amines, imidazolines, aluminum sulfate, copper sulfate, sodium chloride, calcium chloride, or various wetting and insolublizing agents may be used in the binder to increase the water resistance of the resulting paving composition. It is noted that some of these materials producing water resistance are also reacting and dispersing agents so it can thus be seen that combinations of the reacting and dispersing agents can be employed. It has also been found that when some of the reacting and dispersing agents are added to the binder stock in amounts greater than the upper limits of the ranges set forth above, the resultant reacted binder becomes flexible and soft, almost soap-like, and thus loses its ability to produce high compressive strength when it is mixed with aggregate and soils, or aggregate and soils and another binding material.

As previously stated, the binder stock is available as a synthetic product or as a product from the refining of crude tall oil. The binder stocks from these two sources provide compounds of substantially the same characteristics. A comparison of the penetration and softening point of the synthetic and natural binder stocks, reacted and unreacted with a reacting and dispersing agent, was made. In each of the reacted samples a NaOH solution was used as the reacting and dispersing agent and was added to the binder stock or binder stock fraction with the mixture being heated to a temperature of from 120° F. to 200° F. Each of the resulting reacted samples contained 4% NaOH by weight. The results of the comparison are shown in Table 4.

TABLE 4

| Sample | Penetration, 100 gms., 5 sec., 77° F., .1 mm. | Softening point, ° F. |
|---|---|---|
| Natural [1] | | |
| Complete binder stock: | | |
| Unreacted | [2] | 52 |
| Reacted | 34 | 180+ |
| Low mol. wt. stock fraction: | | |
| Unreacted | [3] | [3] |
| Reacted | 173 | 85 |
| High mol. wt. stock fraction: | | |
| Unreacted | 230 | [2] |
| Reacted | 12 | 180+ |
| Synthetic: | | |
| Complete binder stock: | | |
| Unreacted | [2] | 49 |
| Reacted | 42 | 180+ |
| Low mol. wt. stock fraction: | | |
| Unreacted | [3] | [3] |
| Reacted | 165 | 100 |
| High mol. wt. stock fraction: | | |
| Unreacted | 225 | [2] |
| Reacted | 10 | 180+ |

[1] The low and high mol. wt. fractions were obtained from the complete binder stock by fractional distillation methods. The unsaponifiable fraction was also obtained by such fractional distillation methods, but because this fraction is not reactable with the reacting and dispersing agents, it was not possible to obtain comparative penetration and softening point results. The synthetic unsaponifiable fraction had the same characteristics as the fraction from the natural binder stock and thus no comparative penetration and softening point results were obtained for it.
[2] Too soft to run.
[3] Liquid.

The penetration test shown in Table 4 was made according to the test outlined in ASTMD5–61, wherein the distance in tenths of millimeters was measured that a needle weighted to 100 grams penetrated into the sample in 5 seconds with the sample maintained at 77° F. The softening point test was made according to the procedure outlined in ASTM E28–58T, wherein the sample was supported in an annular ring with a ball weight resting on the sample. As the sample was gradually heated, the temperature at which the sample softened sufficiently to let the ball force it downward a distance of one inch was measured.

It can be concluded from Table 4 that the binders obtained from natural and synthetic stocks, as well as the corresponding fractions thereof, have comparable penetration and softening points. It can be further concluded from Table 4 that the reacted binder samples have substantially improved characteristics, such as lower penetration values and higher softening points, over the corresponding unreacted binder stock samples. It can be further concluded from Table 4 that the reacted high molecular weight fractions and the complete reacted binders containing all of the fractions have penetration values and softening points in the same ranges, and that either or both may be used as an aggregate binder in the same proportions. The binders formed with the reacted low molecular weight fractions are not as efficient as binders formed with the high molecular weight fractions or with the complete binder stocks, and will not alone provide satisfactory binders. However, the low molecular weight fractions may be combined with the high molecular weight fractions to provide a satisfactory binder, and in the case of the complete binder stock they are combined with the high molecular weight fractions as well as the unsaponifiable materials, and this combination, the complete binder stock, does produce an excellent binding material.

In order to evaluate the amount of reacting and dispersing agent that should be used with the binder stock, a series of samples was prepared using a natural sand with the following gradation:

| Sieve No. | 4 | 8 | 16 | 50 | 100 | 200 |
|---|---|---|---|---|---|---|
| Percent passing | 100 | 75–95 | 50–75 | 8–25 | 1–17 | 0–5 |

Samples of the unreacted binder stock containing all three of its fractions were mixed with different amounts of a solution of NaOH, and the resultant binder was then mixed with the sand. The resulting paving samples contained a mixture of 98% sand and 2% binder. All of the samples were compacted with a California Kneading Compactor according to the procedures in ASTM D1561–58T, wherein the test samples were compacted at various numbers of tamps at 250 p.s.i. followed by a final compaction of 150 tamps at 500 p.s.i. and a leveling static load of 1000 p.s.i. so as to insure true and uniform surfaces. All of the compaction was carried out at room temperatures, and after compaction, the samples were dried in an oven at 140° F. for 48 hours to insure removal of moisture.

The compaction procedure produced samples which were 4 inches in diameter and 2½ inches high. To test the compressive strength of these samples, they were confined top and bottom on a compression machine, and a load was applied to each sample at a testing head speed of 1 inch per minute. The loading was continued until the sample failed and a reduction of load was noted with further movement of the testing head. The highest value of the applied load was recorded as the compressive strength. These compressive strengths were recorded at weekly intervals at the end of the first, second, third, sixth, and twelfth weeks. Certain of the samples were recompacted at the end of the twelfth week according to the compaction procedures just described and their recompacted compressive strengths were measured. The results of these tests are shown in Table 5.

TABLE 5

| Sample | Initial compaction tamps at 250 p.s.i. | Compressive strength at weekly intervals in total pounds on sample | | | | | Recompacted compressive strength in total pounds on sample |
|---|---|---|---|---|---|---|---|
| | | 1 | 2 | 3 | 6 | 12 | |
| 98% Sand, 2% Binder reacted with: | | | | | | | |
| 1% NaOH | 145 | 10,000 | 10,000 | 6,700 | 7,400 | 8,600 | [1] |
| 2% NaOH | 154 | 16,000 | 16,000 | 15,000 | 14,500 | 14,800 | 11,800 |
| 3% NaOH | 162 | 15,000 | 15,400 | 14,700 | 15,800 | 17,600 | 12,400 |
| 4% NaOH | 139 | 15,500 | 14,600 | 15,700 | 17,800 | 18,500 | 14,500 |
| 10% NaOH | 136 | 13,600 | 13,000 | 15,000 | 15,400 | 15,500 | [1] |

[1] Recompacted compressive strengths not measured.

The results obtained as set forth in Table 5 establish that optimum compressive strengths are obtained when about 4% of the NaOH reacting and dispersing agent is added to the binder stock. This quantity of the reacting and dispersing agent in combination with the binder stock also provides paving compositions which are easily compacted and which have the maximum recompacted compressive strengths.

In order to show the effect of the use of the binder when it was prepared with reacting and dispersing agents other than NaOH, a series of samples were prepared using sand having the same gradation as the samples shown in Table 5. Samples of the binder stock containing all three of its fractions were reacted at room temperature with 10% of the various reacting and dispersing agents based on the weight of the binder stock, and the resultant reacted binder was then mixed with the sand. In some samples, however, it was necessary because of the solubility characteristics of the agent, to mix the unreacted binder stock, the agent, and the sand together at the same time, but in every case the resulting sample of pavement contained 2% of the reacted binder. All of the pavement samples were compacted in the same manner as the samples shown in Table 5 and their compressive strengths were measured at the end of 1 and 3 week intervals in the same manner as described in Table 5. The results of these tests are shown in Table 6.

TABLE 6

| Agent | Compressive strength in total pounds on sample | |
|---|---|---|
| | 1 week | 3 weeks |
| NaCl | 12,800 | 15,300 |
| NaF | 19,000 | 22,000 |
| Na$_2$SO$_4$ | 15,000 | 21,500 |
| KOH | 15,500 | 15,000 |
| KCl | 17,600 | 18,600 |
| K$_2$SO$_4$ | 17,800 | 8,600 |
| Ba(OH)$_2$ | 8,000 | 9,800 |
| BaCl$_2$ | 11,500 | 15,500 |
| BaSO$_4$* | 12,500 | 16,800 |
| Ca(OH)$_2$* | 6,800 | 7,100 |
| CaCl$_2$ | 10,200 | 13,200 |
| Mg(OH)$_2$* | 14,500 | 18,000 |
| MgCl$_2$ | 17,000 | 18,600 |
| MgSO$_4$ | 11,800 | 13,500 |
| Al(OH)$_3$ | 10,500 | 11,600 |
| AlCl$_3$ | 14,200 | 16,800 |
| Al$_2$(SO$_4$)$_3$ | 15,000 | 18,500 |
| CuSO$_4$ | 15,500 | 24,000 |
| FeCl$_3$ | 23,200 | 24,800 |
| Fe$_2$(SO$_4$)$_3$ | 3,400 | 3,600 |
| ZnSO$_4$ | 10,000 | 13,500 |
| NH$_4$Cl | 25,000 | 26,400 |
| (NH$_4$)$_2$SO$_4$ | 20,000 | 22,000 |
| NH$_4$OH | 15,200 | 15,600 |
| G-39M** | 19,200 | 19,600 |
| Ready Coat E-11*** | 17,000 | 16,200 |
| Monoethanolamine | 15,700 | 15,800 |
| Triethanolamine | 26,000 | 25,500 |

*Unreacted binder stock, agent, and sand mixed together simultaneously.
**A mixture of imidazolines sold by National Aluminate Company.
***A mixture of secondary and tertiary amines sold by Armour Chemical Division.

It can thus be seen that each of the reacting and dispersing agents reacts with the unreacted binder stock to produce a binder which can be mixed with a mineral aggregate to produce a paving composition having high compressive strength.

The binder can also be combined with flexible binding materials, such as bituminous materials and aggregate to produce paving compositions having improved properties over paving compositions employing only the flexible binding materials. To establish these improved results, samples were prepared using sand having the same gradation as the sand used in the sample shown in Table 5. The sand was mixed with an asphaltic emulsion comprising 60% asphalt of 150 penetration, 1.8% crude tall oil, 0.25% NaOH, and 37.95% water, and varying quantities of the binder stock reacted with 4% of NaOH. The samples in this series of tests were divided into two sets with one set being compacted and recompacted at room temperature and the other set at 230° F. Both sets of samples were compacted, recompacted, and tested according to the same procedures described in connection with the samples in Table 5. The results of this series of tests are shown in Table 7.

The results as set forth in Table 7 establish that the paving compositions containing the larger percentages of the binder had greater compressive strengths than did the compositions containing the smaller percentages of the binder and the control compositions in which the residue from the asphaltic emulsion served as the only binding material. These improved results were carried forward in the recompacted compressive strengths, wherein the compositions with the larger percentages of the binder had greater recompacted compressive strengths. The paving compositions containing the larger percentages of the binder also compacted more easily at elevated temperature.

The data shown in Table 7 establishes that the binder combines with an asphaltic emulsion to produce a paving composition having improved properties over paving compositions employing the emulsion as the only binding material. A series of tests was conducted to establish the effect of combining an asphalt with the unreacted binder stock. In this series of tests, samples of paving compositions were prepared with sand having the same gradation characteristics described in connection with the samples of Table 5. To such sand was added varying amounts of an 85/100 penetration asphalt and binder stock which had not been reacted with a reacting and dispersing agent. All of these samples were compacted at 230° F. Two sets of control samples were also included in the test series. One of said sets of controls was a paving composition formed solely of sand and the asphalt, and the other set of controls was formed solely from the sand and the unreacted binder stock. The compressive strengths of all of the samples were measured in the manner described in connection with the samples in Table 5 at weekly intervals at the end of the first, third, and twelfth weeks. The results of these tests are shown in Table 8.

TABLE 7

| Sample | Percent bitumen and binder | | Initial compaction tamps at 250 p.s.i. | Compressive strength at weekly intervals in total pounds on sample | | | | | Recompacted compressive strength in total pounds on sample |
|---|---|---|---|---|---|---|---|---|---|
| | Bitumen | Binder | | 1 | 2 | 3 | 6 | 12 | |
| 96% sand, 4% asphaltic emulsion residue | 4.0 | 0.0 | ¹45 | 3,450 | 5,200 | 5,200 | 5,500 | 5,400 | ¹4,400 |
| 96% sand, 4% asphaltic emulsion residue and binder | 3.84 | .16 | ¹45 | 4,200 | 4,400 | 4,800 | 5,500 | 6,600 | ¹5,000 |
| Do | 3.68 | .32 | ¹45 | 5,050 | 6,500 | 7,400 | 8,200 | 9,600 | ¹8,200 |
| Do | 3.2 | 0.8 | ¹45 | 16,900 | 18,900 | 17,200 | 18,600 | 22,600 | ¹13,500 |
| 96% sand, 4% asphaltic emulsion residue | 4.0 | 0.0 | ²150 | 6,400 | 6,600 | 6,900 | 6,600 | 6,850 | ²6,600 |
| 96% sand, 4% asphaltic emulsion residue and binder | 3.84 | .16 | ²125 | 7,900 | 7,400 | 8,600 | 8,600 | 8,600 | ²8,000 |
| Do | 3.68 | .32 | ²140 | 7,900 | 8,000 | 7,900 | 9,400 | 9,750 | ²10,400 |
| Do | 3.2 | 0.8 | ²115 | 11,500 | 12,500 | 12,500 | 14,600 | 14,800 | ²13,500 |

¹ Compacted and recompacted at room temperature.
² Compacted and recompacted at 230° F.

TABLE 8

| Sample | Percent bitumen and binder stock in sample | | Initial compaction tamps at 250 p.s.i. | Compressive strength in total pounds on sample at weekly intervals | | |
|---|---|---|---|---|---|---|
| | Asphalt | Binder stock | | 1 | 3 | 12 |
| 96% sand, 4% asphalt | 4.0 | 0.0 | 138 | 6,300 | 6,500 | 7,800 |
| 96% sand, 4% unreacted binder stock | 0.0 | 4.0 | 147 | 2,400 | 2,700 | 2,900 |
| 96% sand, 4% asphalt and unreacted binder stock | 3.6 | 0.4 | 139 | 4,200 | 4,500 | 5,000 |
| Do | 3.2 | 0.8 | 150 | 3,200 | 3,400 | 3,800 |
| Do | 2.0 | 2.0 | 155 | 2,600 | 2,700 | 3,000 |

The results obtained as set forth in Table 8 establish that paving compositions formed from only aggregate and a flexible binding material are stronger than paving compositions employing a flexible binding material and the unreacted binder stock. These data further establish that when a flexible binding material is combined with the unreacted binder stock, the resultant paving composition will be stronger when larger quantities of the flexible binding material are employed. It can thus be concluded from the data in Tables 5, 7, and 8 that unreacted binder stock used as the only binding material produces paving compositions having unsatisfactory compressive strengths, and the unreacted binder stock in comination with a flexible binding material does not produce paving compositions having improved compressive strengths. However, the binder (reacted binder stock) used as a binding material in combination with a flexible binding material produces paving compositions having improved compactive properties and compression strengths over paving compositions employing only a flexible binding material.

The test data set forth in Table 7 show the improved results of adding the binder to flexible binding materials in the form of asphaltic emulsions. The binder may also be used in combination with other flexible binding materials to produce improved paving compositions. A series of tests was run in which test samples were prepared using the binder stock reacted with 4% NaOH based upon the weight of the binder stock. A set of the samples was prepared using sand of the same gradation as the sand of the previous tests and a 60/70 penetration asphalt, with the asphalt being mixed with the sand and the reacted binder stock then being added to the mixture. Another set of samples was prepared using the binder, an asphalt diluted or cut-back with a solvent such as naphtha, kerosene, or fuel oil, and the sand. Two sets of control samples were also prepared by mixing the 60/70 penetration asphalt and sand and by mixing the cut-back asphalt with the sand. In each sample employing the cut-back asphalt, said cut-back asphalt comprised 70% 60/70 penetration asphalt and 30% solvent. In each sample in each set, there was a total of 4% binding material and 96% sand. The compaction and compressive test procedures described in connection with the samples whose data are shown in Table 5 were used and the compressive strengths of the samples were recorded at weekly intervals at the end of the first, second, third, sixth, and twelfth weeks. The results of these tests are shown in Table 9.

binding material and thus improves its ability to coat both wet and dry aggregate. If further improves the resulting paving composition by making it less temperature susceptible, that is, less brittle in cold weather and more stable in hot weather.

The binder also improves the characteristics of paving compositions employing a rigid binding material like portland cement. A series of samples was prepared using different proportions of portland cement and the binder stock reacted with 4% NaOH as binding materials. Control samples using portland cement as the only binding material were also prepared. The aggregate portion of the sample was sand having the same gradation characteristics as the sand employed in the samples whose data are shown in Table 5. Each sample was comprised of 96% sand and 4% binding material. The compressive strengths of the various samples were measured at the end of one, three, and twelve weeks according to the procedure described in the other tests. The results of this series of tests are shown in Table 10.

TABLE 10

| Sample | Percent portland cement and binder in sample | | Compressive strength in total pounds on sample at weekly intervals | | |
|---|---|---|---|---|---|
| | Portland cement | Binder | 1 | 3 | 12 |
| Sand, portland cement | 4.0 | 0 | 11,700 | 14,300 | [1] 14,000 |
| Sand, portland cement, binder | 3.6 | 0.4 | 9,500 | 10,000 | [1] 10,000 |
| Do | 3.2 | 0.8 | 6,700 | 7,000 | [1] 7,000 |
| Do | 0.8 | 3.2 | 10,000 | 10,000 | [2] 10,000 |
| Do | 0.4 | 3.6 | 12,500 | 14,500 | [2] 14,500 |

[1] Samples failed in brittle fracture and could not be recompacted.
[2] Samples could be recompacted.

The test data as set forth in Table 10 establish that paving compositions in which the binding materials are comprised of relatively high percentages of the binder have compressive strengths equivalent to or greater than paving compositions employing portland cement as the only binding material. The data further establish that paving compositions employing substantial percentages of the binder in combination with portland cement are less brittle and can be recompacted, whereas paving compositions employing only portland cement or a high percentage of portland cement as binding materials are very brittle and cannot be recompacted.

A comparison of the data in Tables 7, 9, and 10 shows that the binder, when used in combination with a flexible

TABLE 9

| Sample | Percent bitumen and binder in sample | | Initial compaction tamps at 250 p.s.i. | Compaction Temp., °F. | Compressive strength in total pounds on sample at weekly intervals | | | | |
|---|---|---|---|---|---|---|---|---|---|
| | Bitumen | Binder | | | 1 | 2 | 3 | 6 | 12 |
| Sand, 60/70 asphalt | 4.0 | 0.0 | 150 | 230 | 9,900 | 9,900 | 10,650 | 10,800 | 11,200 |
| Sand, 60/70 asphalt, binder | 3.84 | .16 | 115 | 230 | 10,000 | 12,500 | 12,500 | 14,000 | 14,050 |
| Sand, cut-back asphalt | 4.0 | 0.0 | 178 | ([1]) | 8,200 | 8,250 | 8,500 | 9,000 | 9,100 |
| Sand, cut-back asphalt, binder | 3.84 | .16 | 130 | ([1]) | 8,500 | 9,400 | 9,200 | 9,700 | 10,000 |

[1] Room.

The data as set forth in Table 9 establish that the binder in combination with asphalt produces paving compositions having greater compressive strengths than paving compositions employing the asphalt as the only binding material. It further establishes that the binder in combination with the asphalt produces paving compositions having improved compaction properties over paving compositions employing the asphalt as the only binding material as shown by the number of tamps required for initial compaction. The data shown in Table 9 further establish that the binder in comination with the cut-back asphalt forms paving compositions having improved compressive strengths and compaction properties over paving compositions employing the cut-back asphalt as the only binding material.

When the binder is used with a flexible binding material, it also increases the adhesive properties of the flexible binding material, produces a paving composition which is more rigid and has a greater compressive strength than paving compositions employing only a flexible binding material. These data further establish that the binder, when used in combination with a rigid binding material, produces paving compositions which are more flexible than paving compositions using a rigid binding material alone, without a reduction in the compressive strength of the paving compositions. The data further show that the binder, when used in combination with a flexible binding material, produces paving compositions which can be more easily compacted than paving compositions employing only a flexible binding material.

A comparison of the data from Table 5 with the data in Tables 7, 9, and 10 shows that paving compositions employing only the binder as a binding material have strength characteristics at least equivalent to, and in most cases better than, the paving compositions employing the binder in combination with flexible or rigid binding materials. Such a comparison further shows that the binder produces paving compositions having greater recompacted compressive strengths and improved initial compaction characteristics than paving compositions employing only a flexible or a rigid binding material.

The binder can be used alone as a binding material for substantially any desired aggregate, including sand, gravel, soil, or the like. When it is used with soil, it may be desirable that the soil be treated with from about .1% to about 2%, based on the weight of the binder, of a material such as amines, imidazolines, sodium dichromate, sodium chlorate, calcium chloride, aluminum sulfate, hydrated lime, highly divided portland cement, or the like to increase the water resistance of the binder. Sodium and calcium chloride, amines, imidazolines, and aluminum sulfate, may also be used as reacting and dispersing agents for the binder stock, as previously explained, and where they are used as such an agent, another or additional material for increasing water resistance will normally not be required. The same is true when the binder is used in combination with portland cement as a binding composition. Normally, when the binder is used as the only binding material, it should be present in the aggregate in an amount of from about 1% to about 9% based upon the weight of the aggregate. Greater quantities of the binder can be employed, but such additional quantities are not necessary or economical.

As shown in Tables 7, 9, and 10, the binder may be added to other binding materials such as tar, asphalt, asphaltic emulsions, portland cement, or the like. When the binder is used in combination with another binding material to produce a composite binding composition, the binder should comprise from about 2% to about 98% of the weight of the composition.

The binder may also be used in combination with plasticizers such as synthetic and natural rubbers, and soft waxes (i.e. paraffin, slop waxes from the petroleum industry, or the like). These plasticizers which are desirably added to the binder at the rate of from about 2% to about 10%, based on the weight of the binder, prevent the binder from becoming brittle.

The binder, alone or in combination with a flexible or rigid binding material, may also be used in combination with fillers and fibers, such as for example, asbestos fibers, nylon, rock wool, highly divided portland cement, and the like. The fillers and fibers reduce the voids in a paving composition employing the binder and thus can be used for density control. The fibers increase the cohesive strength of the binder in the paving composition. In using a filler with the binder in a paving composition, from about 1% to about 15% of the filler should be used based on the weight of the aggregate. When the binder is used in combination with portland cement as a binding composition, another filler material will normally not be required. In using a fiber with the binder in a paving composition, from about 1% to about 10% of the fiber should be used based on the weight of the aggregate.

When the binder is employed in combination with an asphaltic emulsion, it may be added to the finished emulsion. Alternatively, the reacting and dispersing agent may be added into the emulsion formula followed by the addition of the unreacted binder stock. Another alternative comprised adding the binder to the emulsion as part of the aqueous phase of the emulsion and then forming the emulsion. This is a highly desirable method of incorporating the binder into an emulsion, since the subsequent emulsification milling of the binder, asphaltic material, and water will cause a better dispersion of the binder throughout the resultant emulsion. When the binder is used in combination with portland cement, it can be mixed with the cement by including it with the water phase of the mix.

It is not necessary that the binder be added to the aggregate or mixed with another binding material to produce a paved surface. A paved surface can be produced employing the aggregate and a flexible binding material by laying down a mixture of these materials and then spreading the binder thereover. Similarly, if the binder is to be used as the only binding material in forming a paved surface, the aggregate can be laid on the surface to be paved and the binder then spread thereover. In this instance, the binder may be spread over the aggregate, or the reacting and dispersing agent and unreacted binder stock can be separately spread over the aggregate, or either the reacting and dispersing agent or unreacted binder stock can be mixed with the aggregate for application with the aggregate to the surface to be paved and then the remaining component spread thereover. When the halides of the alkali metals or alkaline earth metals, hydroxides of calcium or magnesium, and barium sulfate, are used as agents for the unreacted binder stock, it is desirable that said agents and the unreacted binder stock be added separately to the aggregate.

In producing a paving composition using the binder as the only binding material or using it in combination with a flexible binding material, the total amount of binding materials in the paving composition should be from about 1% to about 9% based on the weight of the aggregate. In producing a paving composition using the binder in combination with a rigid binding material, the total amount of binding materials in the paving composition should be from about 1% to about 16% based on the weight of the aggregate. In using the binder as the only binding material in the paving composition, about 4% of the binder based on the weight of the aggregate is preferred.

The binder with or without additions to increase water resistance as mentioned heretofore can also be applied as a surface coat to an existing surface. In such an application the binder is merely spread over the surface to be coated, and, upon drying, it forms a hard and durable pavement layer over said surface.

I claim:
1. A method of using an aggregate binder mixture obtained from the separation of various sub-mixtures of tall oil pitch or vegetable oil pitches to form with an aggregate a paving composition and which when said mixture is obtained from the vacuum distillation of tall oil pitch comprises the steps of collecting a plurality of distillation cuts of said tall oil pitch to form a first sub-mixture of low molecular weight fatty and rosin acids and unsaponifiable esters, collecting the undistilled bottoms of said tall oil pitch to form a second sub-mixture of unsaponifiable material consisting essentially of aliphatic alcohols, steroils, hydrocarbons, pigments, and appreciable amounts of cholesterol, collecting and mixing together another plurality of distillation cuts of said tall oil pitch and undistilled bottoms to form a third sub-mixture of high molecular weight fatty acids, trimers and tetramers of polymerized rosin acids, decarboxylated rosins and unsaponifiable matter, said first sub-mixture having a molecular weight in the range of from about 32 to about 720, iodine number of from about 110 to about 130, from about 16% to about 36% free fatty acids, and from about 20% to about 30% polymerized unsaponifiable matter, said second and third sub-mixtures having a molecular weight in the range of from about 460 to about 1200 with said third sub-mixture having an acid number of from about 90 to about 170, ester value of from about 9 to about 16, saponification number of from about 165 to about 180, from about 70% to about 90% of free fatty acids, and from about 1% to about 3% unsaponifiable matter, combining said sub-mixture to provide said mixture with from about 5% to about 30% of said first sub-mixture, from about 5% to about 40% of said second sub-mixture, and from about 30% to about 90% of said third sub-mixture; mixing said mixture with from about 1% to about 15%, based on the weight of the mixture, of a dispersing agent to provide said paving composition with both initial and recompacted improved strength characteristics without forming a soap with said mixture; mixing from about 1% to about 9%, based upon the weight of the aggregate, of said mixture and dispersing agent with aggregate to form said paving composition; and paving a surface therewith.

2. The method as set forth in claim 1 with the addition that a plasticizer is added to said mixture and dispersing agent prior to said aggregate in an amount of from about 2% to about 10% based on the weight of said mixture.

3. A method of using an aggregate binder mixture obtained from the separation of various sub-mixtures of tall oil pitch or vegetable oil pitches to form with an aggregate a paving composition and which when said mixture is obtained from the vacuum distillation of tall oil pitch comprises the steps of collecting a plurality of distillation cuts of said tall oil pitch to form a first sub-mixture of low molecular weight fatty and rosin acids and unsaponifiable esters, collecting and mixing together another plurality of distillation cuts of said tall oil pitch and undistilled bottoms to form a second sub-mixture of high molecular weight fatty acids, trimers and tetramers of polymerized rosin acids, decarboxylated rosins and unsaponifiable matter, said first sub-mixture having a molecular weight in the range of from about 32 to about 720, iodine number of from about 110 to about 130, from about 16% to about 36% free fatty acids, and from about 20% to about 30% polymerized unsaponifiable matter, said second sub-mixture having a molecular weight in the range of from about 460 to about 1200, an acid number of from about 90 to about 170, ester value of from about 9 to about 16, saponification number of from about 165 to about 180, from about 70% to about 90% free fatty acids, and from about 1% to about 3% unsaponifiable matter, combining said sub-mixtures to provide said mixture with from about 5% to about 30% of said first sub-mixture, and from about 30% to about 90% of said second sub-mixture, mixing said mixture with from about 1% to about 15%, based on the weight of the mixture, of a dispersing agent to provide said paving composition with both initial and recompacted improved strength characteristics without forming a soap with said mixture; mixing from about 1% to about 9%, based upon the weight of the aggregate, of mixture and dispersing agent with aggregate to form said paving composition; and paving a surface therewith.

4. A method of using an aggregate binder mixture obtained from the separation of various sub-mixtures of tall oil pitch or vegetable oil pitches to form with an aggregate a paving composition and which when obtained from the vacuum distillation of tall oil pitch comprises mixing a plurality of distillation cuts and the undistilled bottoms of said pitch to provide a mixture of high molecular weight fatty acids, trimers and tetramers of polymerized rosin acids, decarboxylated rosins, and polymerized unsaponifiable matter, said mixture having a molecular weight in the range of from about 460 to about 1200, an acid number of from about 90 to about 170, ester value of from about 9 to about 16, saponification number of from about 165 to about 180, from about 70% to about 90% free fatty acids, and from about 1% to about 3% unsaponifiable matter, mixing from about 1% to about 15%, based upon the weight of the mixture, of a dispersing agent with said mixture to provide said paving composition with both initial and recompacted improved strength characteristics without forming a soap with said mixture; mixing from about 1% to about 9%, based upon the weight of the aggregate, of said mixture and dispersing agent with aggregate to form said paving composition; and paving a surface therewith.

5. The method as set forth in claim 1 with the addition that a bituminous material selected from the class consisting of asphalt, cut-back asphalt, asphaltic emulsions, tars, road oils, and the like is mixed with said paving composition, said mixture and dispersing agent constituting from about 2% to about 98% of the overall weight of the bituminous material, dispersing agent, and mixture.

6. The method as set forth in claim 3 with the addition that a bituminous material selected from the class consisting of asphalt, cut-back asphalt, asphaltic emulsions, tars, road oils, and the like is mixed with said paving composition, said mixture and dispersing agent constituting from about 2% to about 98% of the overall weight of the bituminous material, dispersing agent, and mixture.

7. The invention as set forth in claim 4 with the addition that a bituminous material selected from the class consisting of asphalt, cut-back asphalt, asphaltic emulsions, tars, road oils, and the like is mixed with said paving composition, said mixture and dispersing agent constituting from about 2% to about 98% of the overall weight of the bituminous material, dispersing agent and mixture.

8. The method as set forth in claim 1 with the addition that portland cement is mixed with said paving composition, said mixture and dispersing agent constituting from about 2% to about 98% of the overall weight of the cement, dispersing agent and mixture.

9. The method as set forth in claim 3 with the addition that portland cement is mixed with said paving composition, said mixture and dispersing agent constituting from about 2% to about 98% of the overall weight of said cement, dispersing agent and mixture.

10. The method as set forth in claim 4 with the addition that portland cement is mixed with said paving composition, said mixture and dispersing agent constituting from about 2% to about 98% of the overall weight of the cement, dispersing agent and mixture.

11. The method as set forth in claim 3 with the addition that from about .1% to about 2%, based on the weight of the mixture and dispersing agent, of a material selected from the class consisting of amines, imidazolines, sodium dichromate, sodium chloride, calcium chloride, aluminum sulfate, hydrated lime, portland cement, and the like is mixed with said paving composition for increasing the water resistance of said paving composition.

12. The method as set forth in claim 3 with the addition that from about 1% to about 15%, based on the weight of the aggregate, of a filler material is mixed with said paving composition.

13. The method as set forth in claim 3 with the addition that from about 1% to about 10%, based on the weight of the aggregate, of a fibrous material is mixed with said paving composition.

14. The new use for tall oil pitch to produce a binder composition adapted to be mixed with an aggregate to form a paving composition having both initial and recompacted improved strength characteristics which comprises the steps of forming said pitch into a mixture comprising from about 5% to about 30% of a first sub-mixture of low molecular weight fatty and rosin acids and saponifiable esters and having an acid Number of from about 32 to about 72, iodine number of from about 110 to about 130, from about 15% to about 36% free fatty acids, and from about 20% to about 30% polymerized unsaponifiable matter, from about 5% to about 40% of a second sub-mixture of unsaponifiable material consisting essentially of aliphatic alcohols, sterols, hydrocarbons, pigments and appreciable amounts of cholesterol, and from about 30% to about 90% of a third sub-mixture of high molecular weight fatty acids, trimers and tetramers of polymerized rosin acids, decarboxylated rosins, and polymerized unsaponifiable matter and having an acid number of from about 90 to about 170, ester value of from about 9 to about 16, saponification number of from 165 to about 180, from about 70% to about 90% free fatty acids, and from about 1% to about 3% unsaponifiable matter, said first sub-mixture having a molecular weight in the range of from about 80 to about 720 and said second and third sub-mixtures having a molecular weight in the range of from about 460 to about 1200, combining said mixture with from about 1% to about 15%, based on the weight of the mixture, of a dispersing agent to provide said paving composition with said improved strength characteristics without forming a soap with said mixture, and mixing from about 1% to about 9%, based on the weight of the aggregate, of said mixture and dispersing agent with aggregate to form said paving composition.

References Cited
UNITED STATES PATENTS

| | | | |
|---|---|---|---|
| 2,330,792 | 9/1943 | Oliver et al. | 260—97.5 |
| 2,367,462 | 1/1945 | Farber | 106—123 |
| 2,481,356 | 9/1949 | Segessemann | 260—97.5 |
| 2,577,198 | 12/1951 | Kirkpatrick | 260—97.5 |
| 2,728,682 | 12/1955 | Kalmowski et al. | 106—123 |
| 2,840,483 | 6/1958 | Morgan et al. | 106—123X |
| 2,855,319 | 10/1958 | McConnaughay | 106—123 |
| 2,892,727 | 6/1959 | MacPherson | 106—123X |
| 2,941,893 | 6/1960 | McConnaughay | 106—277X |
| 2,978,342 | 4/1961 | LeFebvre | 106—123 |
| 3,009,820 | 11/1961 | Gould | 106—123 |
| 3,063,853 | 11/1962 | Sucetti | 106—282X |
| 3,109,742 | 11/1963 | King et al. | 106—123X |
| 3,123,569 | 3/1964 | Borgfeldt | 106—277X |
| 3,126,350 | 3/1964 | Borgfeldt | 106—277X |
| 3,128,195 | 4/1964 | Patellis | 106—123 |
| 3,238,164 | 3/1966 | Speck | 260—285X |
| 3,253,937 | 5/1966 | Stump, Jr. | 106—123 |
| 3,257,377 | 6/1966 | Hannah, Jr. et al. | 260—97.5 |
| 3,270,631 | 9/1966 | Bower | 106—277X |

DONALD J. ARNOLD, Primary Examiner

J. B. EVANS, Assistant Examiner

U.S. Cl. X.R.

94—20, 21; 106—280, 281, 232, 235, 241